US 6,871,597 B1

(12) United States Patent
Hughes (10) Patent No.: US 6,871,597 B1
(45) Date of Patent: Mar. 29, 2005

(54) MAGNETICALLY LEVITATED TRANSPORTER (75) Inventor: John G. Hughes, Casselberry, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 15 days.

(21) Appl. No.: 10/197,762

(22) Filed: Jul. 17, 2002

(51) Int. Cl.⁷ .............................................. B60L 13/04
(52) U.S. Cl. ....................................................... 104/281
(58) Field of Search ................................ 104/231, 282, 104/283, 284

(56) References Cited

U.S. PATENT DOCUMENTS

| | | | | |
|---|---|---|---|---|
| 3,736,880 A | * | 6/1973 | Ross ........................... 104/282 |
| 4,516,505 A | * | 5/1985 | Heidelberg ................. 104/284 |
| 5,253,591 A | * | 10/1993 | Rote et al. ................... 104/281 |
| 5,904,101 A | * | 5/1999 | Kuznetsov ................... 104/281 |
| 6,418,857 B1 | * | 7/2002 | Okano et al. ............... 104/281 |

* cited by examiner

Primary Examiner—S. Joseph Morano
Assistant Examiner—Robert J. McCarry, Jr.
(74) Attorney, Agent, or Firm—Jeffrey D. Myers; Peacock Myers & Adams, PC (57) ABSTRACT A magnetically levitated transporter comprising a plurality of bogies attached thereto and traveling over a track comprising a plurality of rails, and a method for operating such transporter, comprising a plurality of magnets attached to each bogie, a plurality of the magnets being offset outboard with respect to the rails and a plurality of the magnets being offset inboard with respect to the rails, and a computer control system employing gain scheduling to control current provided to each of the magnets.

22 Claims, 9 Drawing Sheets

MAGNETICALLY LEVITATED TRANSPORTER

BACKGROUND OF THE INVENTION

1. Field of the Invention (Technical Field)

The present invention relates to magnetically levitated transporters and control systems therefor.

2. Background Art

Magnetically levitated transporters (e.g., trains) operating on the principal of magnetic attraction are statically unstable in lift, pitch, and roll. Furthermore, each car of such transporters must be controlled in levitation, pitch, roll, lateral displacement, and yaw. Existing levitated transporter systems are extremely sensitive to the smallest irregularities in the track over which the transporter travels. As the lift magnets pass over an irregularity, the "refrigerator magnet" problem takes over and the car impacts the track.

The present Invention provides a control system that is insensitive to track irregularities. As a result, far less expensive track systems can be employed, with a likely cost savings of approximately 75% compared to existing systems that must have and maintain very uniform tracks.

SUMMARY OF THE INVENTION

The present invention is of a magnetically levitated transporter comprising a plurality of bogies attached thereto and traveling along a track comprising a plurality of rails, and of a method for operating such transporter, comprising: a plurality of magnets attached to each bogie, a plurality of the magnets being offset outboard with respect to the rails and a plurality of the magnets being offset inboard with respect to the rails; and a computer control system comprising gain scheduling means controlling current provided to each of the magnets. In the preferred embodiment, six magnets are used for each bogie, more preferably with four offset outboard and two offset inboard, most preferably with the outboard magnets being proximate the corners of the attached bogie. The gain scheduling means receives for each magnet as input desired force, gap from rail, and lateral displacement and outputs for each magnet a current command. This keeps actual force of each magnet against its rail approximately equal to the input desired force, and eliminates static instabilities due to irregularities in the rails. The computer control system preferably additionally comprises means for decoupling (preferably a decoupling matrix) for each bogie lift, pitch, roll, lateral displacement, and yaw, permitting the magnets of a bogie to provide independent control of lift, pitch, roll, lateral displacement, and yaw.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

Best Modes for Carrying Out the Invention

The present invention is of a gain scheduling method and control system for magnetically levitated transporters traveling along a track comprising one or more rails, such as a maglev train. The system and method of the invention eliminates static instability in levitation, roll, and pitch. An embodiment of the invention also provides decoupling such that each degree of freedom (levitation, pitch, roll, lateral displacement, and yaw) can be controlled independently.

As readily understood by one of ordinary skill in the art, a "track" is any sort of guideway or riding surface (including support structure) that physically guides vehicles designed to travel along it. A "rail" is that portion of the track against which the transporter applies force when traveling. In the preferred embodiment, the track comprises two substantially parallel rails.

In attractive levitation, force is directly proportional to current squared and inversely proportional to gap squared. This presents a fourth-order non-linearity in the control system. The gain scheduling of the present invention adjusts the current in each levitation electromagnet at a high bandwidth such that the current remains proportional to gap.

Force as a function of current and gap can be found as $F=k*I^2/G^2$, where k is a constant of proportionality. The gain scheduler of the present invention adjusts the current in proportion to the gap. Therefore, force remains constant as the gap changes. This eliminates static instability. A decoupling matrix is preferably employed that permits separate control of the five degrees of freedom associated with attractive magnetic levitation.

Figure 1:
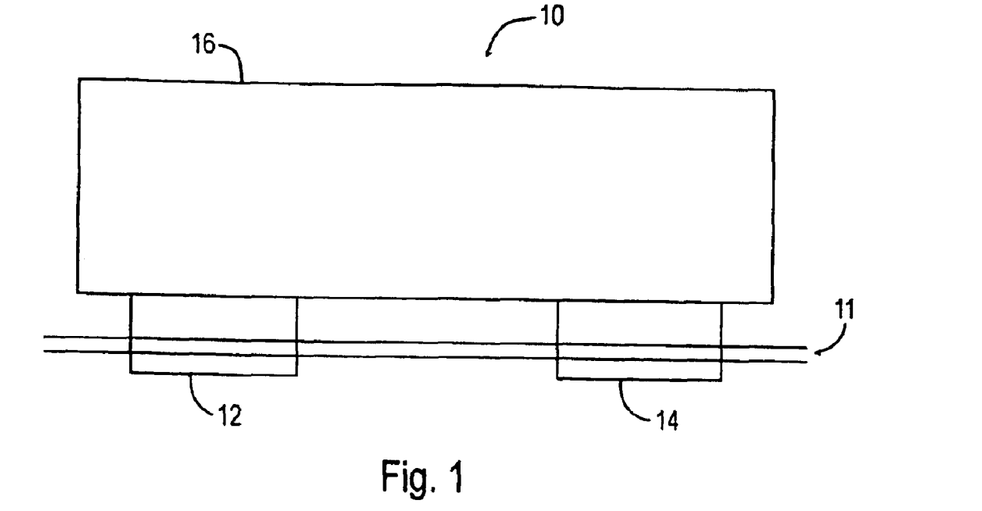
FIG. 1 is a side view of a magnetically levitated transporter according to the invention.
Figure 2:
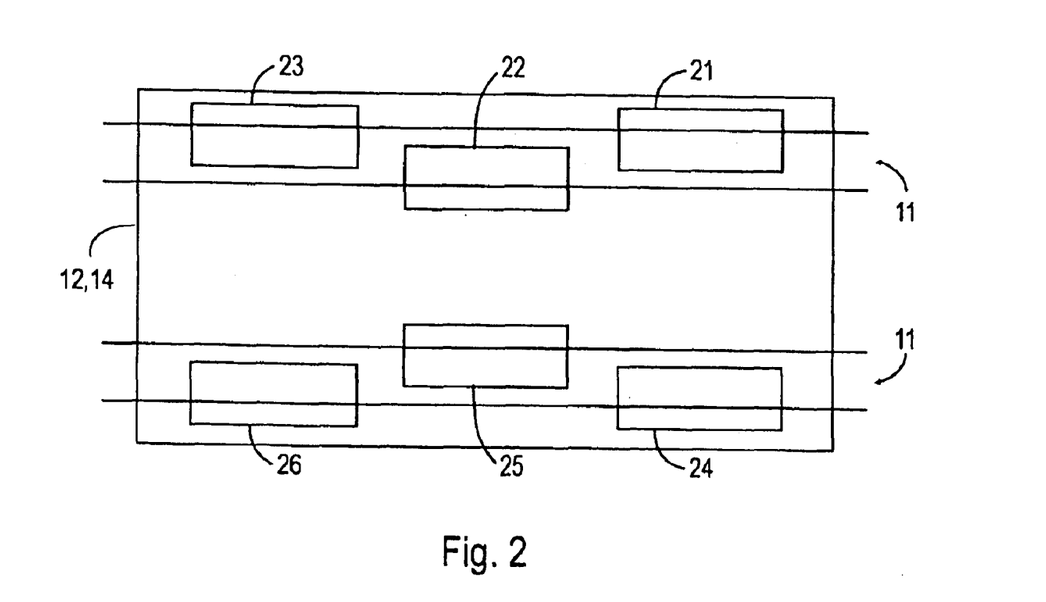
FIG. 2 is a top view of a preferred bogie according to the invention.

An exemplary magnetically levitated transporter 10 shown in FIG. 1 and traveling over track 11 comprises two bogies 12,14 and a cabin 16. Those of ordinary skill in the art will appreciate that the term "bogie" refers to an undercarriage of a prime mover or car of a transportation device (such as a train), but is also intended to include herein any magnet-holding assembly the whole of which provides for magnetic levitation against one or more rails (e.g., the ROMAG system developed in the late 1960's by the Rohr Corporation of Chula Vista, Calif. provided for a rail overhead of the maglev vehicle). As shown in FIG. 2, each bogie preferably comprises six lift magnets 21,22,23,24,25,26 (also referred to as magnets A through F). A computer control system issues commands to current drivers for each of the magnets as described below.

The magnets are preferably placed such that when energized in accordance with a corresponding decoupling matrix in the control computer system the magnets can provide independent control of lift pitch, roll, lateral displacement, and yaw. Note that in FIG. 2 the magnets are placed slightly outboard and inboard of the target metal of the track. In that the magnets naturally want to become aligned with the track, such placement creates a lateral restoring force with each magnet.

When the magnets are placed as illustrated in FIG. 2 and operated in conjunction with the decoupling matrix of Table 1, independent control of lift, pitch, roll, lateral displacement, and yaw can be achieved. A North-East-Down reference frame is used in Table 1.

TABLE 1

| Magnet | A (21) | B (22) | C (23) | D (24) | E (25) | F (26) |
|---|---|---|---|---|---|---|
| Lift | −1 | −1 | −1 | −1 | −1 | −1 |
| Pitch | −1 | 0 | +1 | −1 | 0 | +1 |
| Roll | −1 | −2 | −1 | +1 | +2 | +1 |
| Lateral | −1 | +2 | −1 | +1 | −2 | +1 |
| Yaw | −1 | 0 | +1 | +1 | 0 | −1 |

The bogie of the invention behaves as a rigid structure. For lift, all six magnets experience the same delta force. Because the lift delta force in magnets 21,24 is equal to the delta force in magnets 23,26, no pitch moment is generated. (Because of their placement, magnets 22,25 do not generate any pitch torque.) The delta force in magnets 21,22,23 is equal to the delta force in magnets 24,25,26, so no roll moment is generated. The lateral force delta in magnet 21 is offset by the delta of magnet 24. Magnet 22 is offset by magnet 25. Magnet 23 is offset by magnet 26. Because of their placement, magnets 22,26 do not generate yaw moments. Hence, lift, when generated in accordance with the decoupling matrix, does not couple to any of the other degrees of freedom associated with levitation. Similar considerations apply for the other degrees of freedom and their lack of coupling.

Figure 5A:
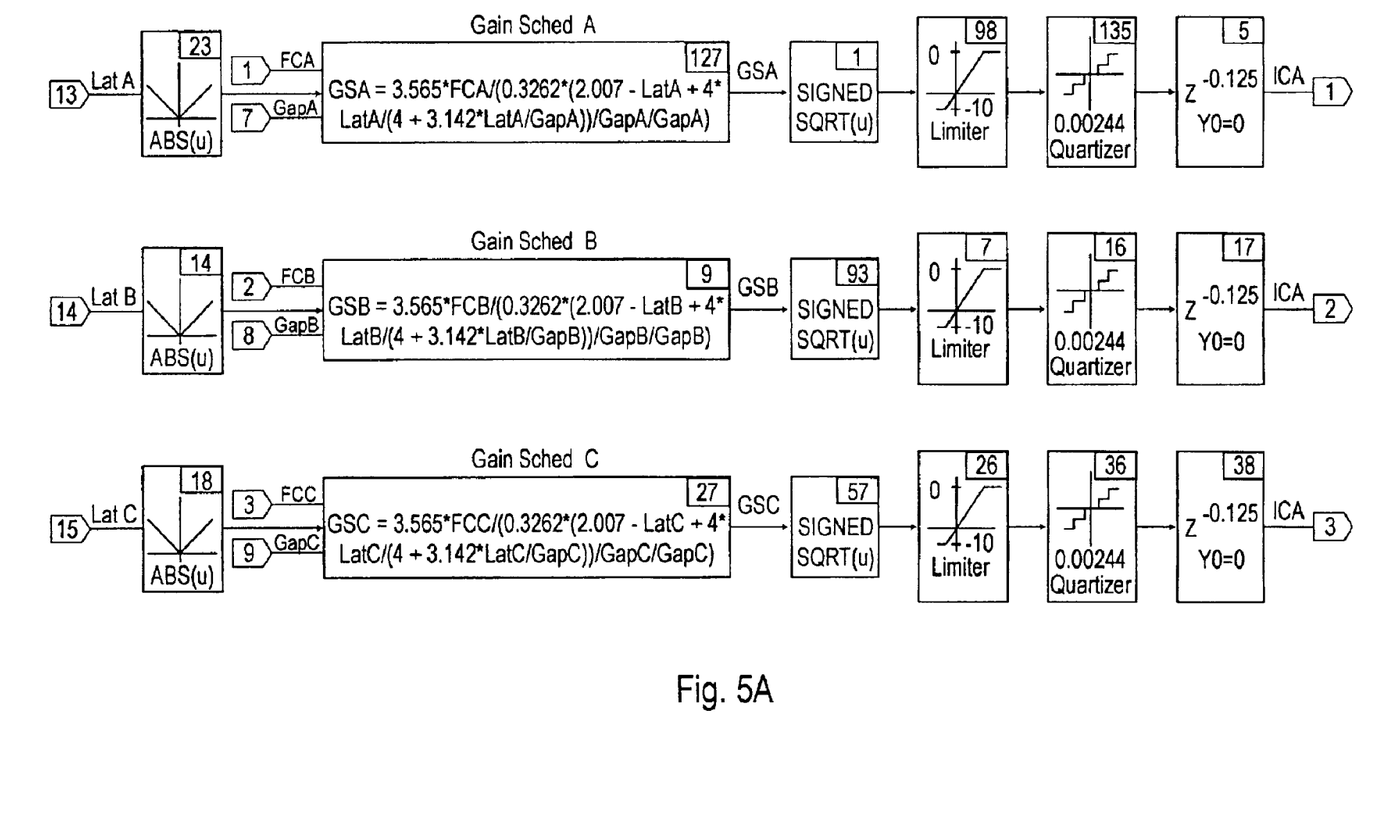
FIGS. 5A and 5B are schematic diagrams of the preferred gain scheduler block of the invention.
Figure 5B:
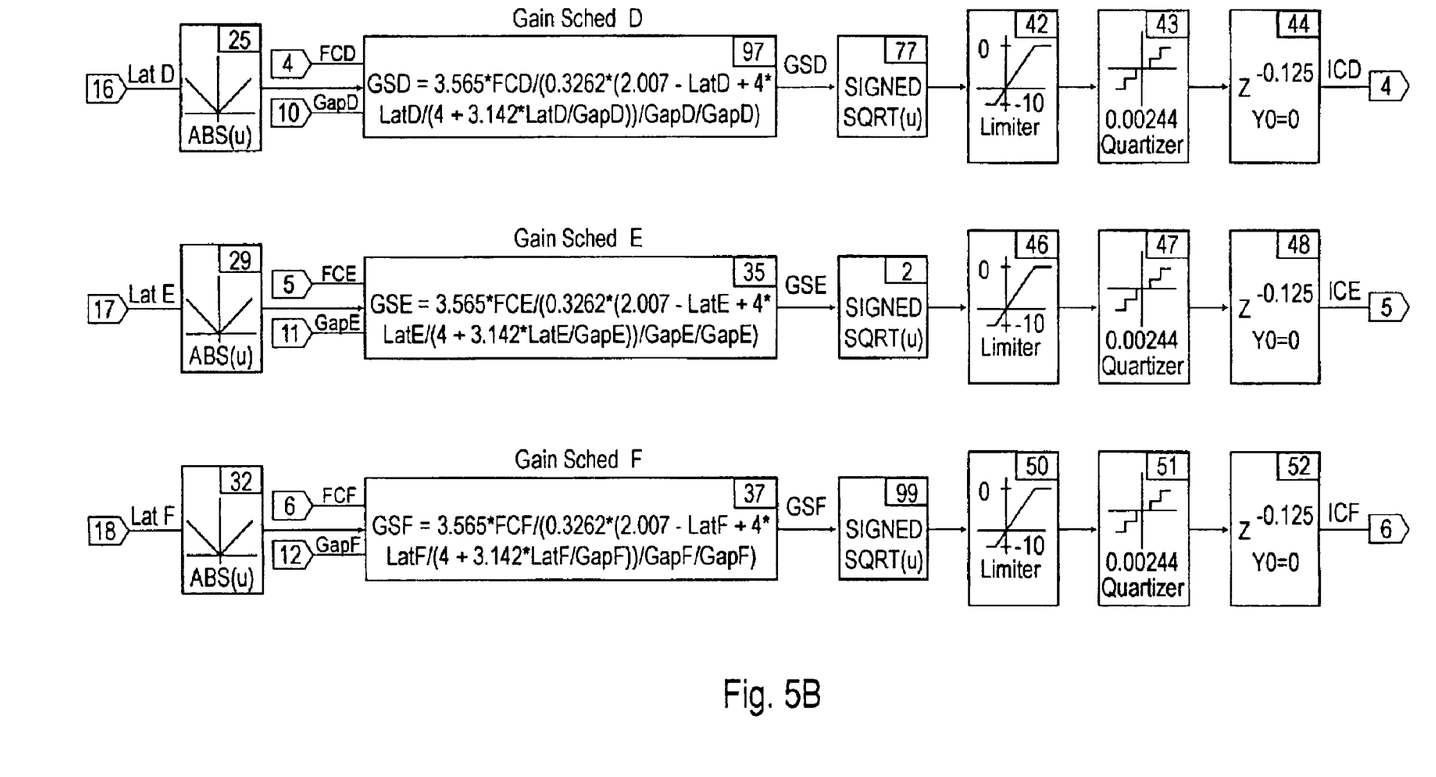

The most significant problem associated with attractive magnetic levitation is the "refrigerator magnet" problem. The force increases by $1/Gap^2$. Because of this, as soon as current in the electromagnet reaches a level great enough for a magnet to start moving, it immediately slams into the track. This results in static instability in lift, pitch, and roll for the bogie. However, lift force is very predictable for each magnet as a function of its gap and lateral displacement with respect to the track as well as its current. Using the force equation, an inverse function can be found such that force can be made constant, namely the inverse of the lift force equation. This is the function if the gain scheduler of the invention (see FIG. 5). Its inputs are desired force, gap, and lateral displacement for each magnet. It outputs a current command for each magnet A through F (ICA through ICF in FIG. 5). This linearizes the system and eliminates static instabilities.

As well understood by one of ordinary skill in the art, the computer control system of the: invention may be implemented in a wide array of technologies as appropriate to the particular application. For example, the primary control computations required by the invention may be implemented in software, firmware, or hardware. For rapid operation, implementation in a Field Programmable Gate Array (FPGA) or Application Specific Integrated Circuit (ASIC) is preferred.

Figure 3A:
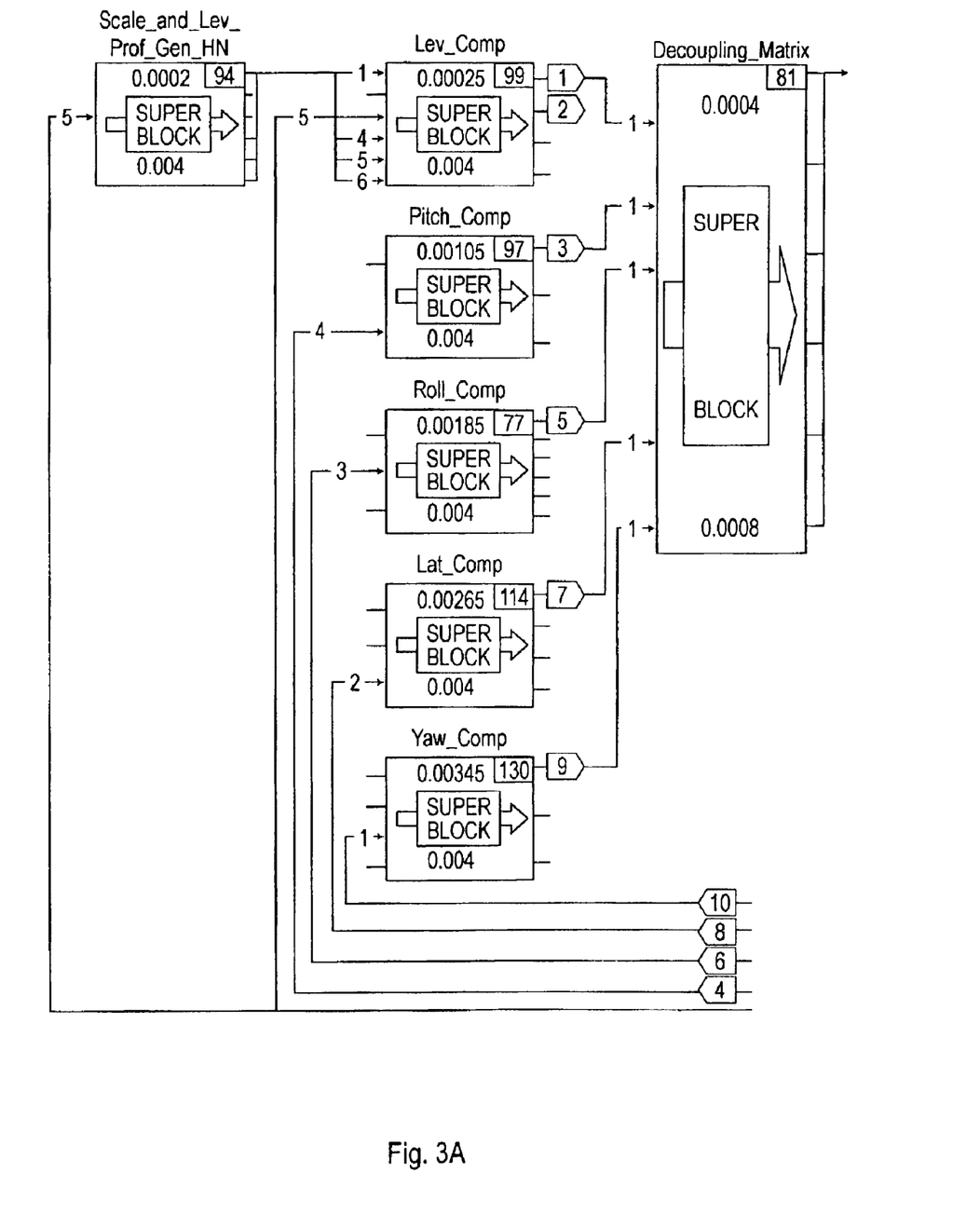
FIGS. 3A, 3B, and 3C are schematic diagrams of the entire preferred control system of the present invention.
Figure 3B:
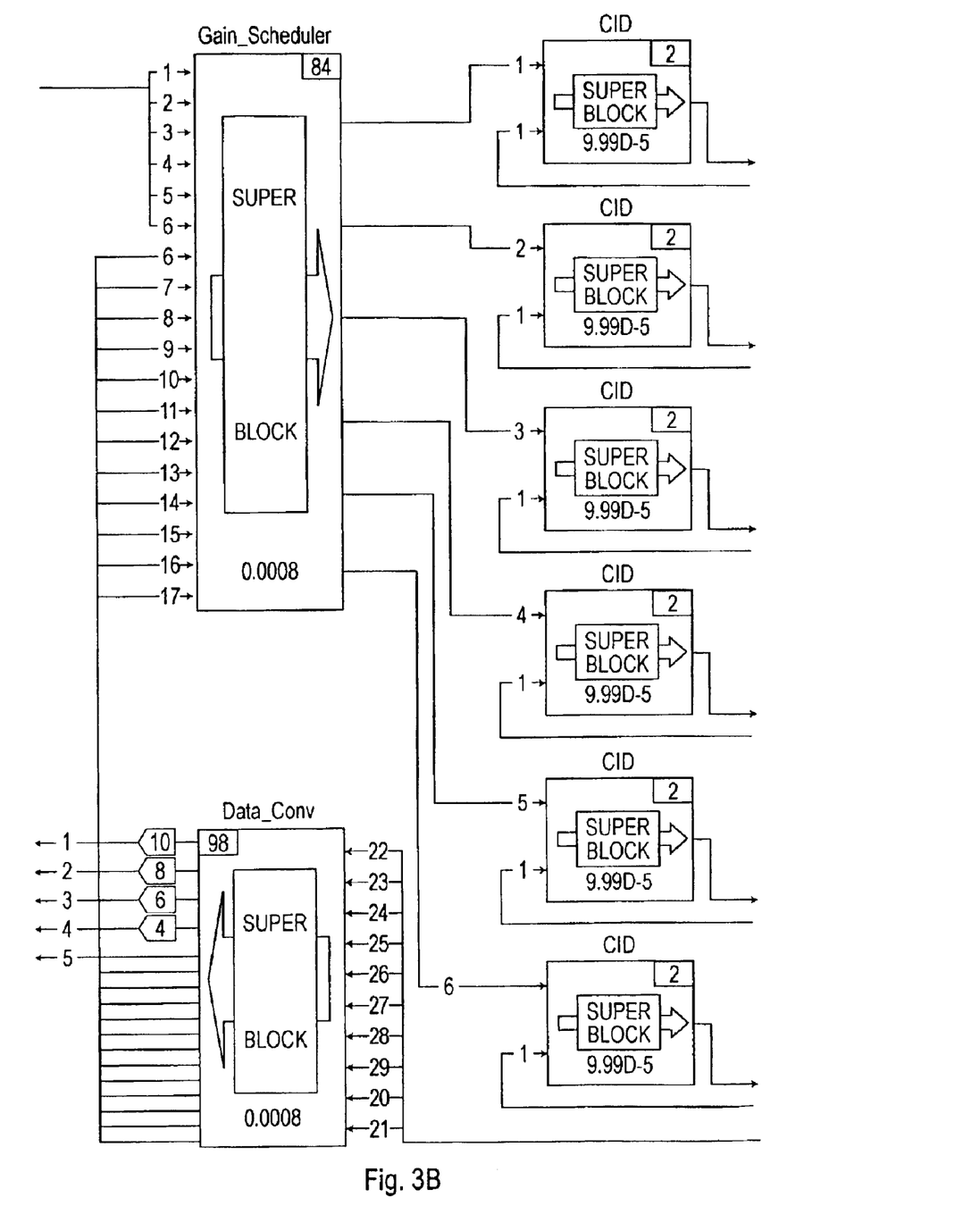
Figure 3C:
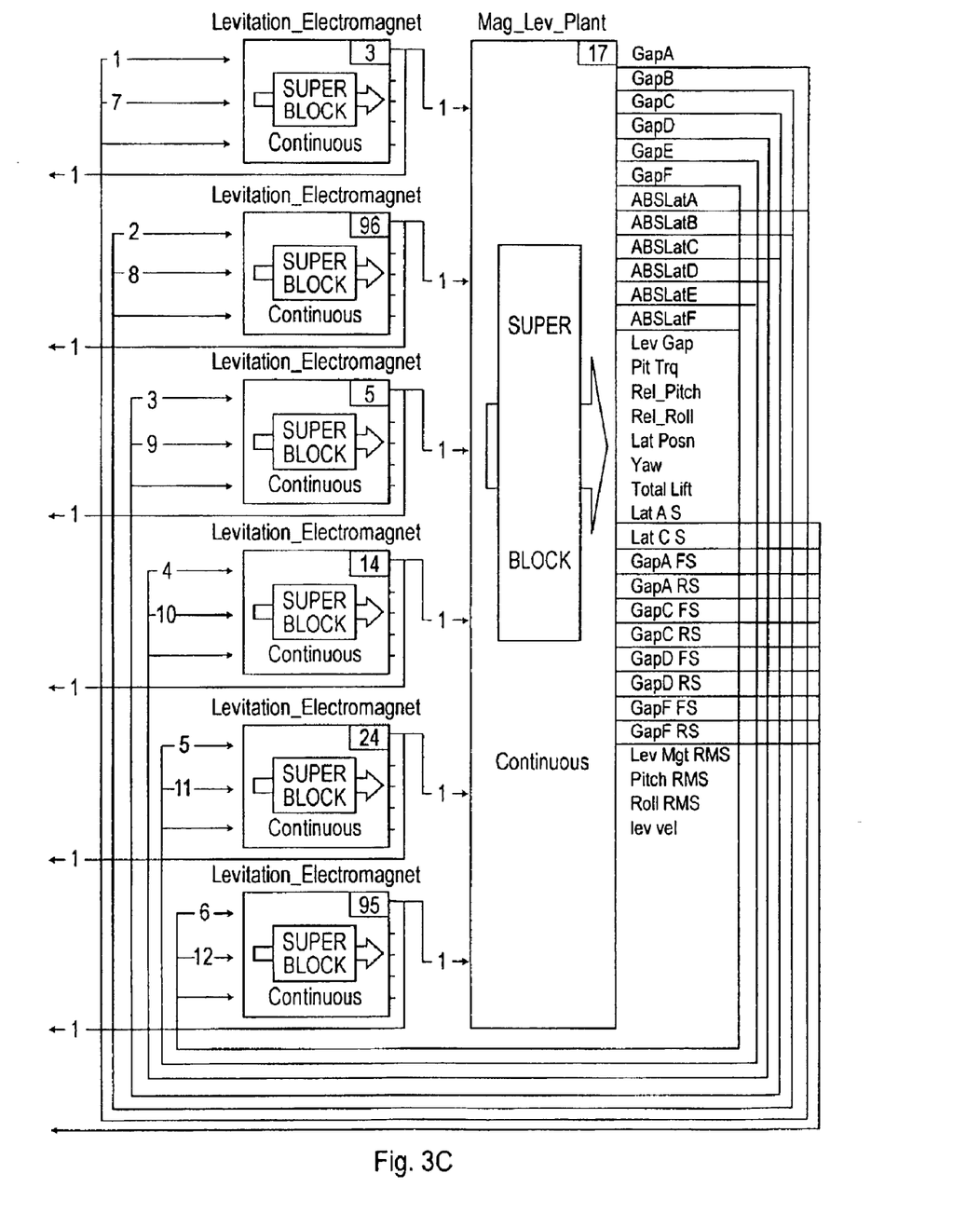
Figure 4:
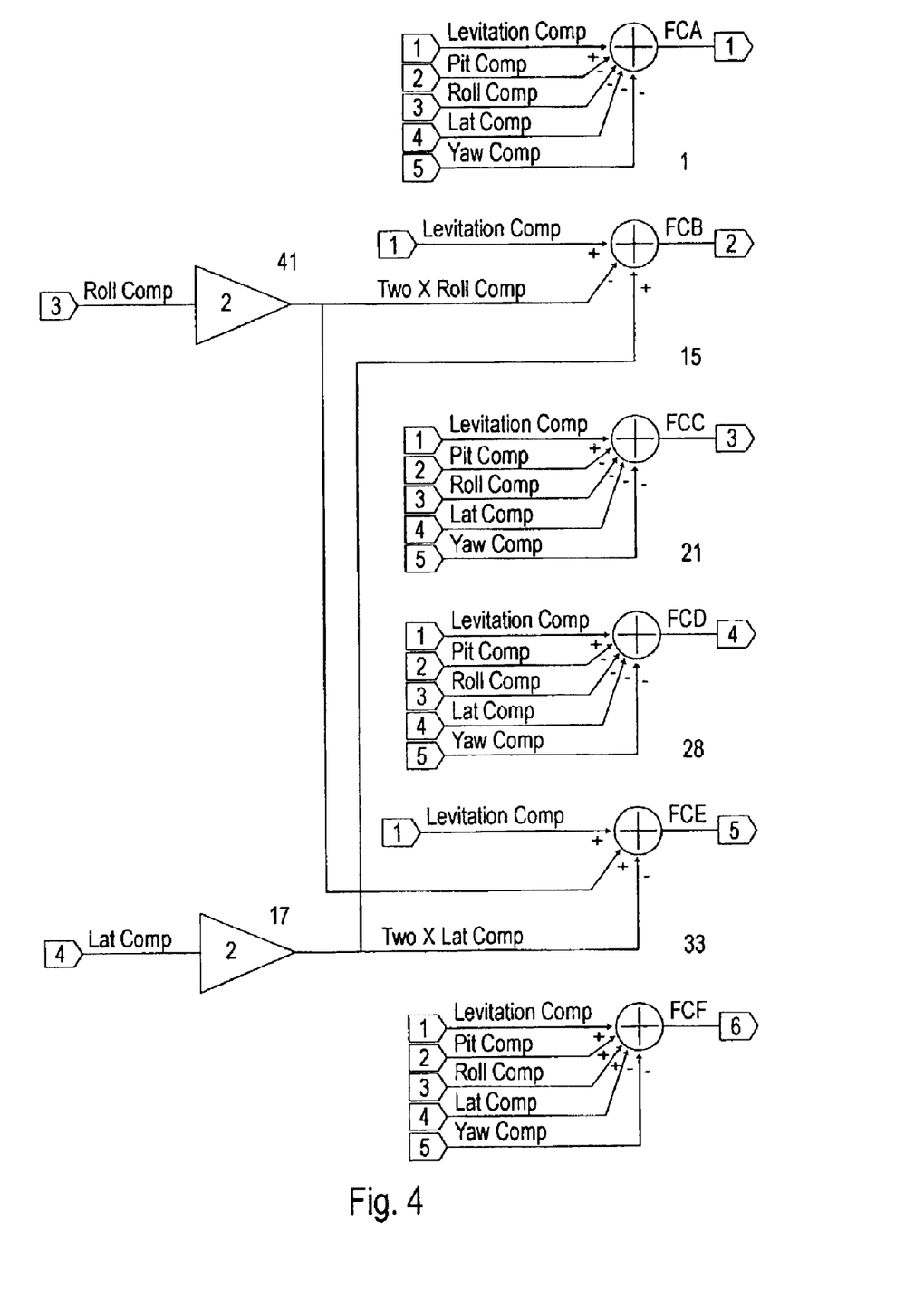
FIG. 4 is a schematic diagram of the preferred decoupling matrix block of the invention.
Figure 6A:
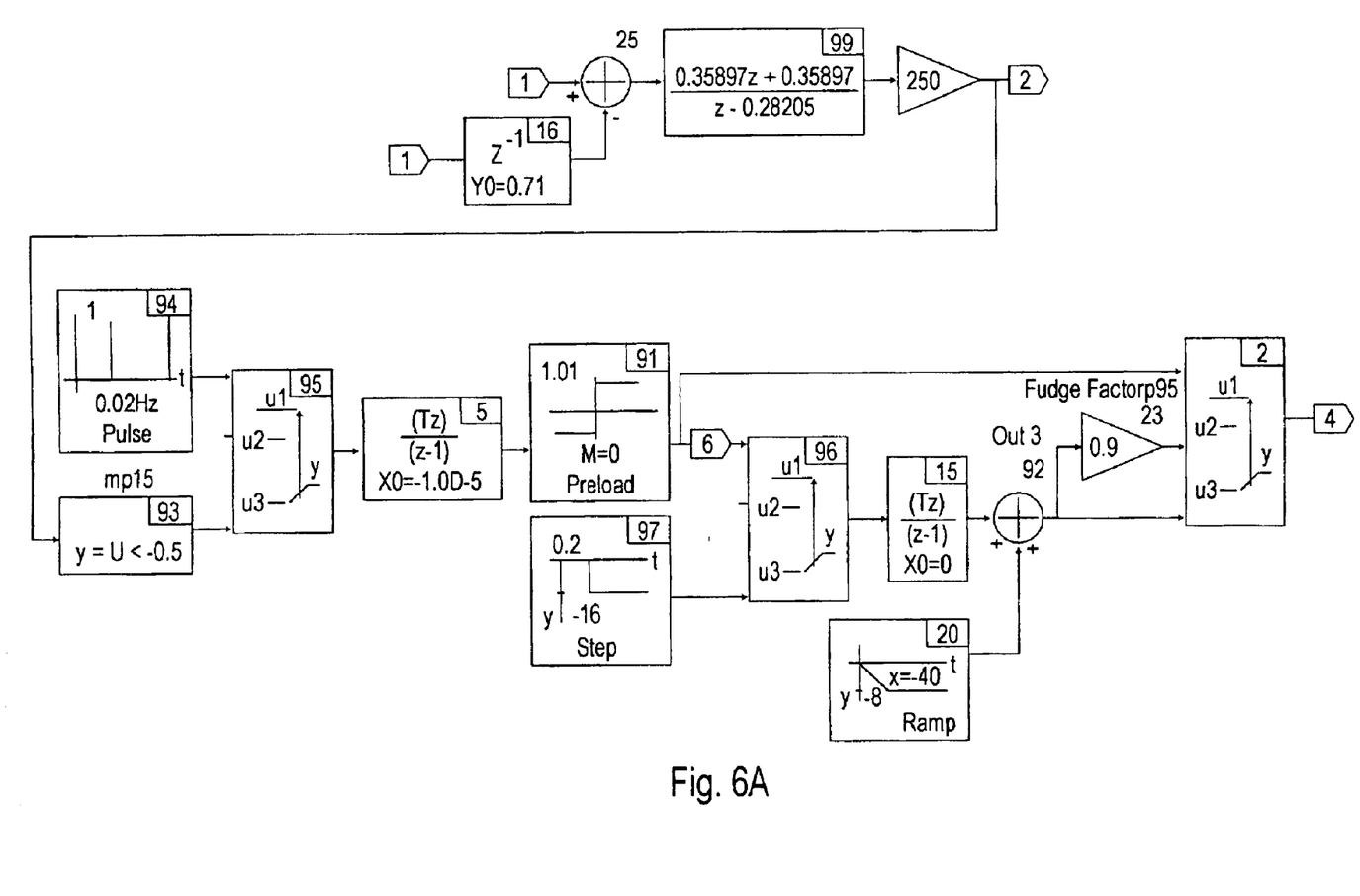
FIGS. 6A and 6B are schematic diagrams of the preferred scale and levitation profile generator block of the invention.
Figure 6B:
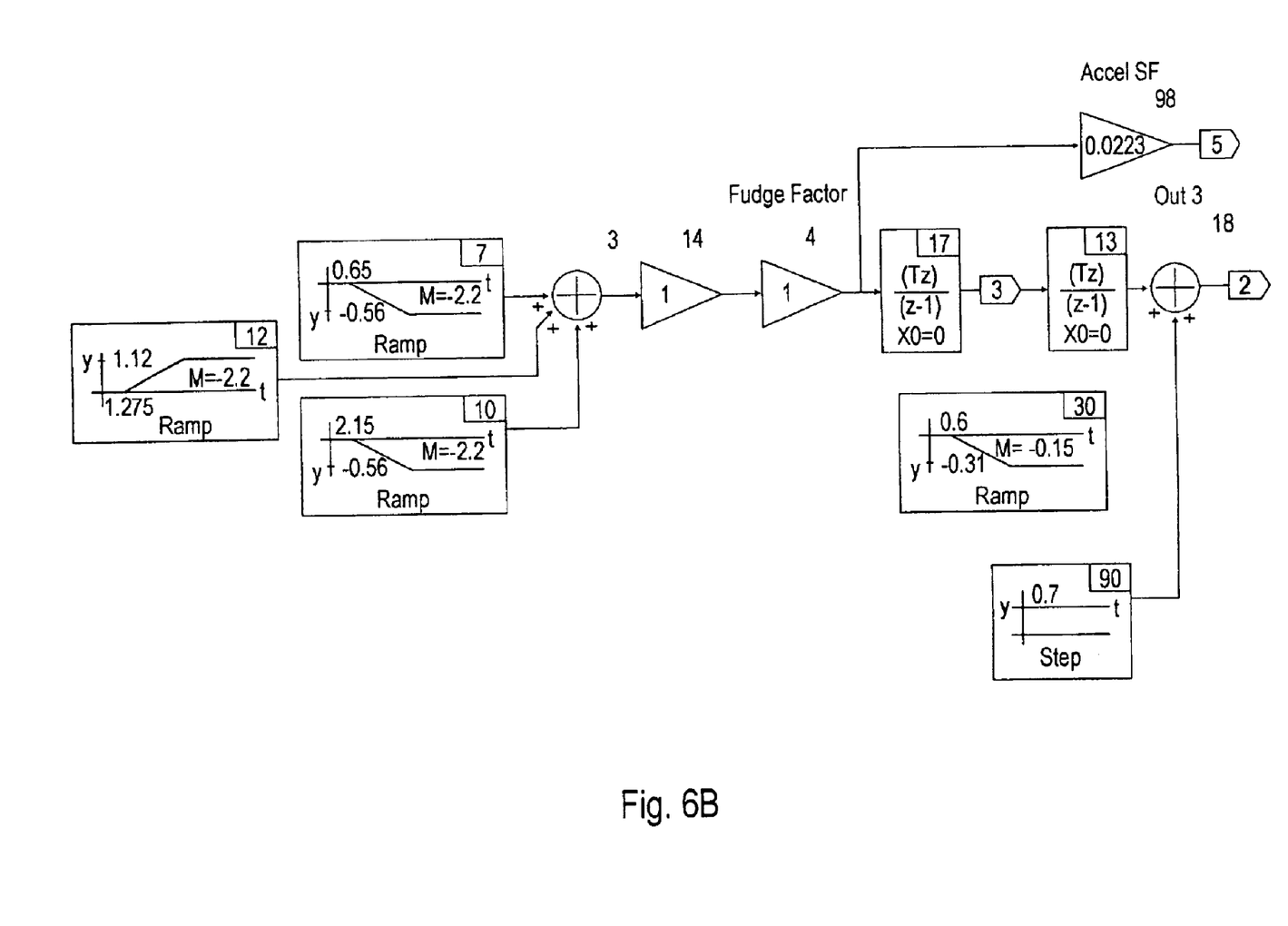

A controls diagram of the entire preferred control system of the present invention is shown in FIG. 3. FIG. 4 is a schematic diagram of the preferred decoupling matrix block of the invention. FIG. 5 is a schematic diagram of the preferred gain scheduler block of the invention. FIG. 6 is a schematic diagram of the preferred scale and levitation profile generator block of the invention. This block ramps up the force command to the levitation height servo. As soon as motion is detected (lift force is equal to the weight of the car), the force command stops ramping up and the levitation height profile is generated. This lifts a car preferably approximately 0.3" above the track.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A magnetically levitated transporter operating along a track comprising a plurality of rails, said transporter comprising:

a plurality of bogies attached to said transporter and traveling along the track;

a plurality of magnets attached to each bogie, a plurality of said magnets being non-repulsive and offset outboard with respect to the rails and a plurality of said magnets being non-repulsive and offset inboard with respect to the rails; and a computer control system comprising decoupling and gain scheduling means controlling current provided to each of said magnets, such that independent control of five degrees of freedom are obtained.

2. The transporter of claim 1 wherein said plurality of magnets for each bogie numbers six.

3. The transporter of claim 2 wherein said plurality of said magnets being offset outboard numbers four and said plurality of said magnets being offset inboard numbers two.

4. The transporter of claim 3 wherein said plurality of said magnets being offset outboard are proximate corners of said attached bogie.

5. The transporter of claim 1 wherein said gain scheduling means receives for each magnet as input desired force, gap from rail, and lateral displacement and outputs for each magnet a current command.

6. The transporter of claim 5 wherein said gain scheduling means keeps actual force of each magnet against its rail approximately equal to said input desired force.

7. The transporter of claim 1 wherein said gain scheduling means eliminates static instabilities due to irregularities in the rails.

8. The transporter of claim 1 wherein said computer control system additionally comprises means for decoupling for each bogie lift, pitch, roll, lateral displacement, and yaw.

9. The transporter of claim 8 wherein said decoupling means comprises means for employing a decoupling matrix.

10. The transporter of claim 8 wherein said decoupling means permits said magnets of a bogie to provide independent control of lift, pitch, roll, lateral displacement, and yaw.

11. A method of operating a magnetically levitated transporter having a plurality of bogies attached thereto and traveling along a track comprising at least one rail, the method comprising the steps of:

attaching a plurality of magnets to each bogie, a plurality of the magnets being non-repulsive and offset from opposing sides of the at least one rail; and controlling force provided by each of the magnets via a computer control system comprising decoupling and gain scheduling means, such that independent control of five degrees of freedom are obtained.

12. The method of claim 11 wherein In the attaching step the plurality of magnets for each bogie numbers six.

13. The method of claim 12 wherein in the attaching step the plurality of the magnets being offset outboard numbers four and the plurality of the magnets being offset inboard numbers two.

14. The method of claim 13 wherein in the attaching step the plurality of the magnets being offset outboard are proximate corners of the attached bogie.

15. The method of claim 11 wherein the controlling step comprises the steps of the gain scheduling means receiving for each magnet as Input desired force, gap from rail, and lateral displacement and outputting for each magnet a current command.

16. The method of claim 15 wherein the outputting step maintains actual force of each magnet against its rail approximately equal to the input desired force.

17. The method of claim 11 wherein in the controlling step the gain scheduling means eliminates static instabilities due to irregularities in the at least one rail.

18. The method of claim 11 wherein in the controlling step the computer control system additionally comprises means for decoupling for each bogie lift, pitch, roll, lateral displacement, and yaw.

19. The method of claim 18 wherein in the controlling step the decoupling means comprises means for employing a decoupling matrix.

20. The method of claim 18 wherein the controlling step comprises the step of providing via the decoupling means to the magnets of a bogie independent control of lift, pitch, roll, lateral displacement, and yaw.

21. The transporter of claim 1 wherein said five degrees of freedom comprise magnetic gap, lateral position, roll angle, pitch angle and yaw angle.

22. The method of claim 11 wherein the five degrees of freedom comprise magnetic gap, lateral position, roll angle and yaw angle.

* * * * *